United States Patent [19]

Kopel

[11] 4,356,529
[45] Oct. 26, 1982

[54] TERMINATED MONOLITHIC CERAMIC CHIP CAPACITOR

[75] Inventor: Jeffrey L. Kopel, Henrietta, Tex.

[73] Assignee: Sprague Electric Company, North Adams, Mass.

[21] Appl. No.: 226,962

[22] Filed: Jan. 21, 1981

[51] Int. Cl.³ ............................................ H01G 1/147
[52] U.S. Cl. .................................... 361/304; 361/303; 361/309; 361/321
[58] Field of Search ............... 361/328, 321, 303, 304, 361/308, 309

[56] References Cited

U.S. PATENT DOCUMENTS

| 2,373,098 | 4/1945 | Brennan | 361/303 |
| 2,968,752 | 1/1961 | Rubinstein et al. | |
| 3,411,193 | 11/1968 | Takacs | 29/25.41 |
| 3,452,257 | 6/1969 | Belko | 361/321 X |
| 3,694,710 | 9/1972 | Kirschner | 361/321 |
| 3,809,973 | 5/1974 | Hurley | |
| 3,890,546 | 6/1975 | Coleman | |

FOREIGN PATENT DOCUMENTS 1197561 7/1965 Fed. Rep. of Germany ...... 361/303

Primary Examiner—Elliot Goldberg
Attorney, Agent, or Firm—Connolly and Hutz

[57] ABSTRACT

A rectangular monolithic ceramic capacitor chip has two or more electrodes extending to separate portions, respectively, of one particular edge of the chip. Parallel spaced conductive layer strips are formed on only one major face of the chip. The strips extend, respectively, over the separte portions of the particular edge to contact the electrodes. A multiple chip termination method includes aligning the chips in a column with the particular edges perpendicular to the column. A stamp has at least two parallel resilient bars each having stubby finger-like projections. Conductive ink is applied to the stamp bars, which are placed over the column with the projections entering the spaces, respectively, between the adjacent chips. Sliding the bar back and forth deposits ink on the one major face and squeezes a small amount of ink on the particular edge portions to contact the extended electrodes. Further, a matrix of ceramic capacitor chips having many columns can be ink coated in one step using one stamp.

7 Claims, 23 Drawing Figures

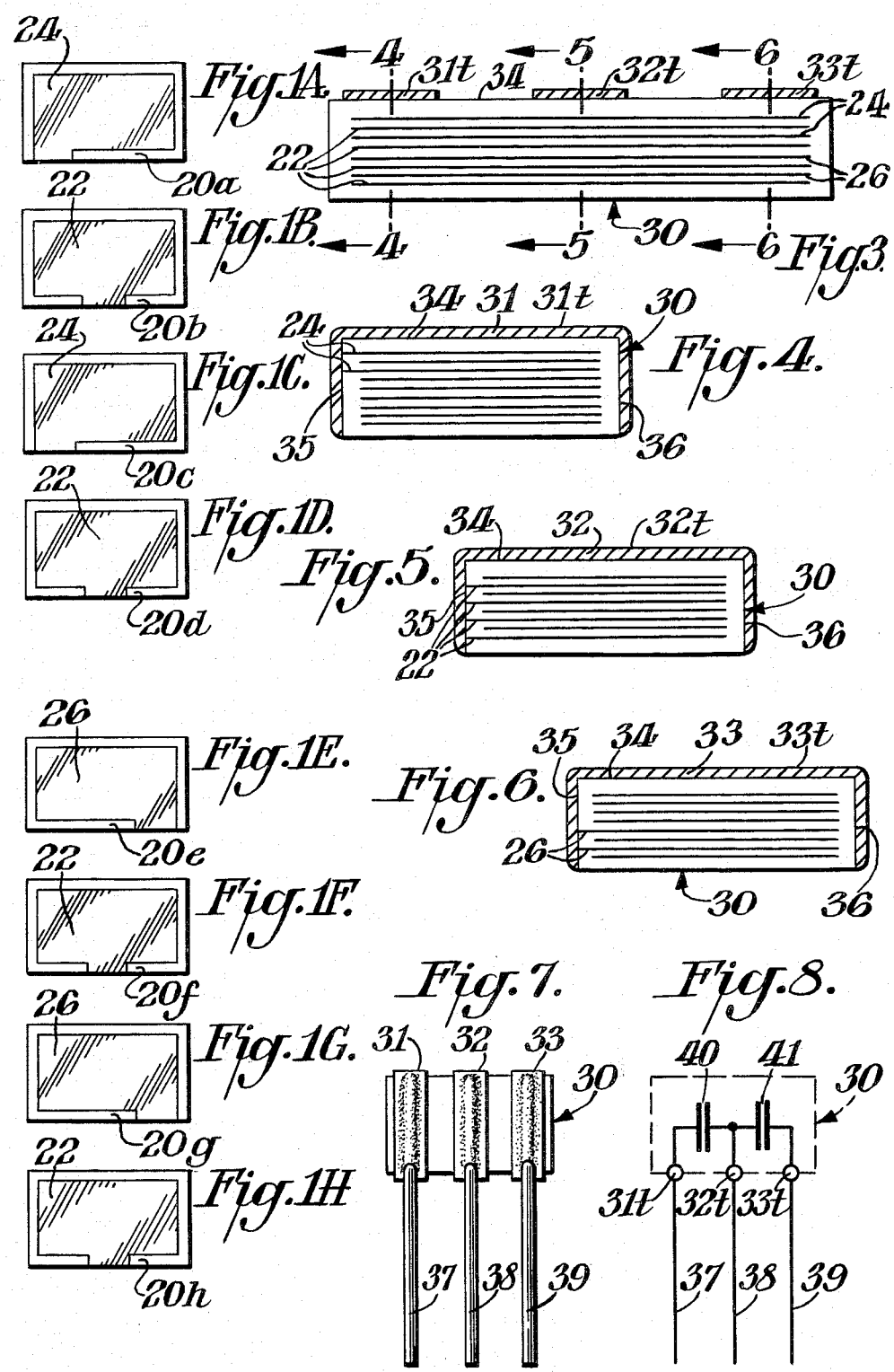

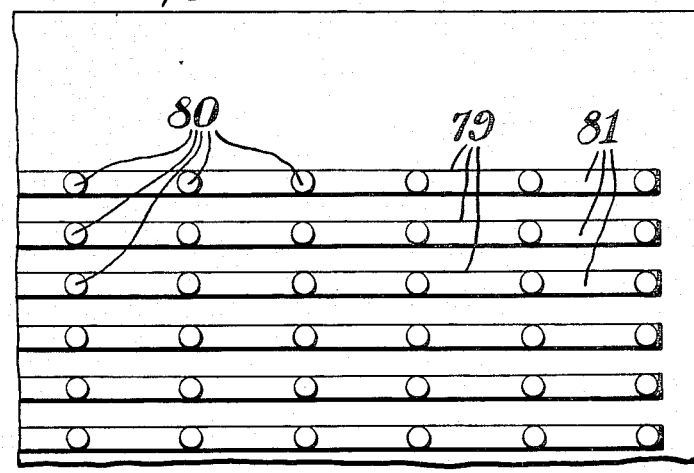
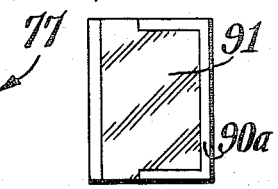
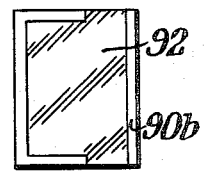
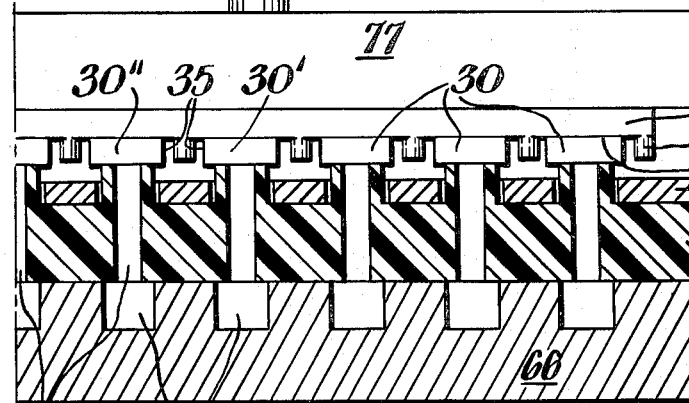
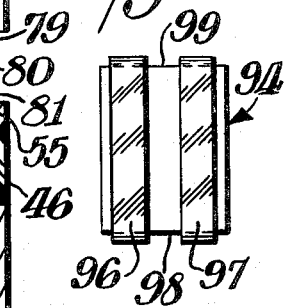
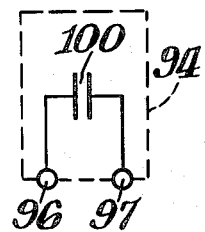
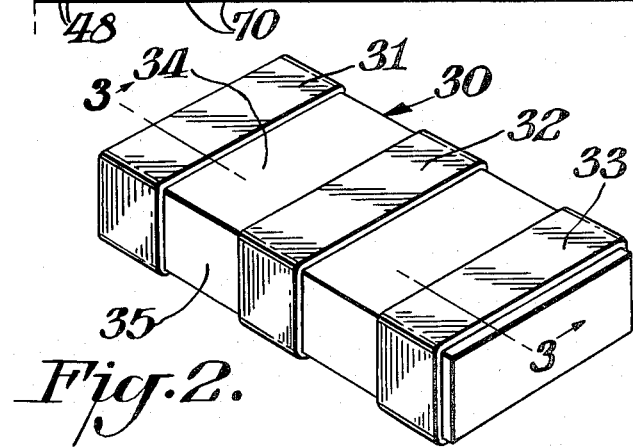

TERMINATED MONOLITHIC CERAMIC CHIP CAPACITOR

BACKGROUND OF THE INVENTION

This invention relates to rectangular monolithic ceramic capacitor chips and more particularly to a conductive layer that is deposited on the chip to contact extended portions of buried electrodes within the chip and to provide terminations by which electrical access may be had to the capacitor.

The simple term "rectangular chip", as used herein is meant to define a body that is an essentially right parallelepiped wherein one of the three key body dimensions is substantially smaller than the rest, rendering the body chip-like or wafer-like in appearance, the body having two major opposite faces, and four edges with relatively small areas.

The most usual monolithic capacitor construction includes a dielectric body having two sets of buried electrodes extending, respectively, to opposite faces of the body. Terminations to such a body are usually provided by dipping first one of the faces into a silver bearing ink and then dipping the opposite face in the silver bearing ink after which the ink is cured as is described by Coleman in U.S. Pat. No. 3,890,546 issued June 17, 1975 and assigned to the same assignee as is the present invention. This kind of silver termination covers all of one and a part of four adjacent body faces and requires the two sequential ink application (dipping) steps.

It is an object of the present invention to reduce the amount of previous termination paste required for terminating a monolithic ceramic capacitor.

It is a further object of this invention to provide a simple mass method for so terminating such a capacitor.

SUMMARY OF THE INVENTION

A mass method for terminating a group of identical rectangular monolithic ceramic chips, each having one set of buried electrodes extending to a portion of a particular chip edge, comprises forming a conductive layer strip on a major face of the chip to serve as a terminal, the conductive layer strip extending over the particular chip edge portion to contact the extended electrodes. This is accomplished by spacing and aligning the group of capacitor chips in a column with their particular chip edges perpendicular, or more precisely orthogonal, to the center line of the column. The particular chip edges may randomly face one or the other directions that are parallel with the column center line. An inking stamp having a resilient bar with finger-like projections having the same spacing along the bar is inked by applying a conductive ink to the flat bottom portion of the bar. The inked stamp is placed over the column of chips and slid back and forth in directions parallel to the column center line to transfer ink from the bar to the major chip face and to squeeze a small amount of ink, by means of the projections, onto the particular chip edges to which the one sets of buried electrodes extend.

For each additional set of buried electrodes that extend to the particular edge in each capacitor chip, there is provided another resilient bar on the stamp. The resilient bars of the stamp are parallel to each other and spaced an amount that corresponds to the spacing of the separate areas of the particular edge in which the first and additional set electrodes extend, respectively.

Alternatively, the electrodes may extend also to the opposite chip edge in which case the above method includes the sliding of the inked stamp to squeeze a small quantity of ink onto both particular and opposite edges to contact both extensions of each set of electrodes.

This method of providing a conductive layer strip on only one major face of a rectangular capacitor chip, which conductive strip extends over two opposite chip edges, is particularly compatible with the simple preferred steps described hereinafter for aligning the group of chips in a column without distinguishing between the two major chip faces or between the longest (or shortest) opposite edges of the chip to one of which the electrodes extend. Thus, the preparatory steps of orienting and holding the chips to be inked in rows and columns need not account for which major face will receive the ink and is therefore placed "upward", nor need to distinguish between the particular or its opposite edge of any chip.

At the same time, the amount of conductive ink employed is reduced typically by a factor of 2 or 3 from that required for terminating monolithic ceramic chips in a conventional manner (whereby for example two sets of electrodes extend, respectively, to opposite chip edges and those edges are twice dipped into an ink pot to coat each time the whole edge and a portion of the two adjacent major chip faces). The reduction of the amount of conductive ink used in the method of this invention is very important when, as is usually the case, the ink contains the increasingly expensive silver.

BRIEF DESCRIPTION OF THE DRAWINGS

FIGS. 1A through 1H, each show in top view a green ceramic layer and a pattern of an electroding ink deposited thereon.

FIG. 2 shows in perspective view a terminated capacitor of this invention that was made by a method including stacking the inked layers shown in FIGS. 1A through 1H and firing the ceramic.

FIG. 3 shows in side sectional view the monolithic ceramic capacitor taken in plane 3—3 of FIG. 2.

FIGS. 4, 5 and 6 show in side sectional view taken in planes 4—4, 5—5, and 6—6, respectively, the capacitor of FIG. 3.

FIG. 7 shows a top view of the capacitor in FIG. 2 with three lead wires having been attached thereto.

FIG. 8 shows a schematic diagram of the capacitor of FIG. 7.

FIG. 11 shows in bottom view a representative portion of an inking stamp employed in the preferred embodiment of the method of this invention.

FIG. 12 shows in end sectional view the jig of FIG. 9 loaded with capacitor bodies, and shows in a side view of the stamp of FIG. 11.

FIGS. 13A and 13B show in top view two green ceramic layers with double extending electrodes.

FIG. 14 shows in top view another capacitor of this invention that includes the layers of FIGS. 13A and 13B.

FIG. 15 shows a schematic diagram of the capacitor of FIG. 14.

DESCRIPTION OF THE PREFERRED EMBODIMENTS

Figure 9:
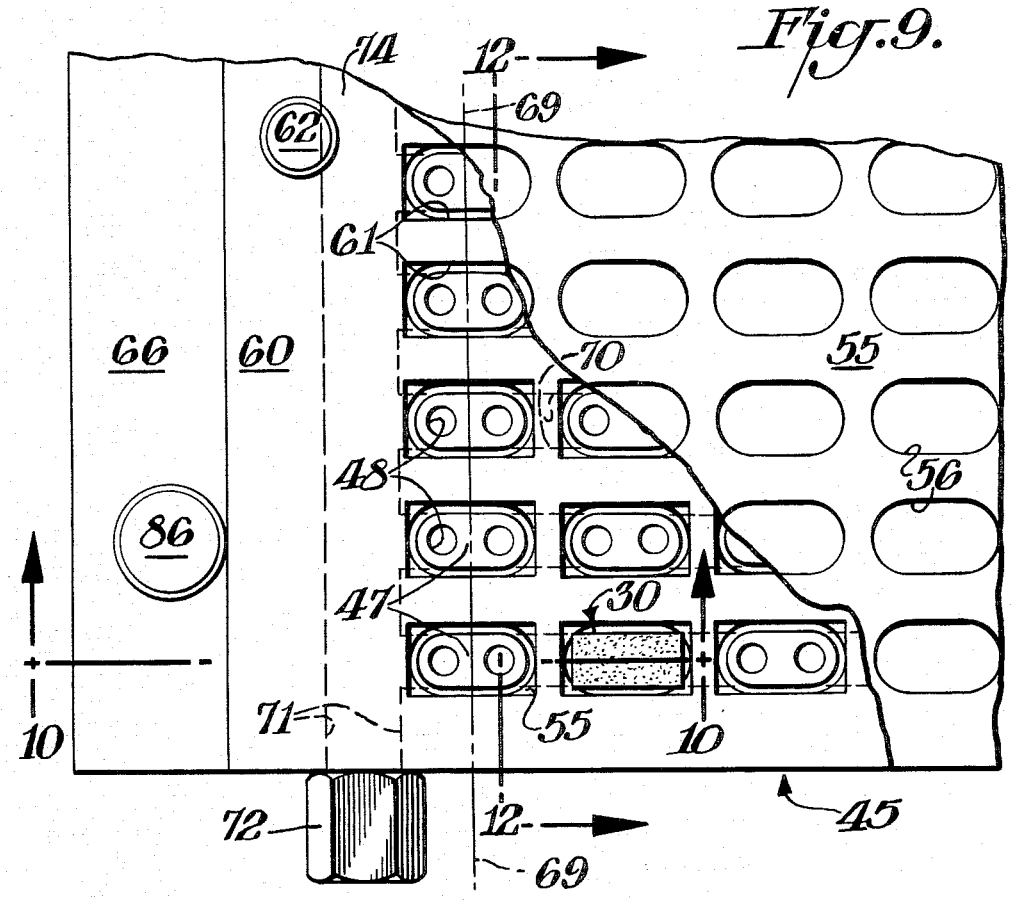
FIG. 9 shows in top view a representative portion of a holding jig employed in a preferred embodiment of the terminating method of this invention.

A monolithic ceramic capacitor body is made by the conventional steps of stacking green ceramic layers 20a and 20h of FIGS. 1A through 1H, adding at least one plain ceramic layer (not shown) to the top of the stack, and firing the ceramic to maturity. A more detailed account of such a process is provided by G. Maher in U.S. Pat. No. 4,027,209 issued May 31, 1977 and assigned to the same assignee as is the present invention.

A film of conductive ink is screen printed onto every other ceramic layer, i.e., 1B, 1D, 1F and 1H, forming electrodes 22 that extend only to a central portion of the lower (as shown) edge of these ceramic layers. Similarly, the electrodes 24 that are screen printed on layers 20a and 20c extend only to a left hand portion (as shown) of the lower ceramic layer edges. Also, the electrodes 26 printed on layers 20e and 20g extend only to a right hand portion (as shown) of the lower ceramic layer edges. These layers are stacked in the order shown and fired.

With reference to FIG. 2, the fired ceramic body 30 is subsequently provided with conductive layer strips 31, 32 and 33. The strips 31, 32 and 33 have, respectively, terminal pad portions 31t, 32t and 33t located on one major face 34 of chip 30 as seen in FIG. 3. The strips 31, 32 and 33 extend over chip edge 35 making contact respectively with the extended parts of electrodes 24, 22 and 26, respectively, as seen, respectively, in FIGS. 4, 5 and 6. Further, the strips 31, 32 and 33 extend over chip edges 36. To the large terminal pad portions 31t, 32t and 33t of conductive strips 31, 32 and 33, there may be connected three wire leads 37, 38 and 39 as shown in FIG. 7.

The equivalent circuit diagram of this assembly is seen in FIG. 8, wherein corresponding elements are assigned the same numerals as in FIG. 7. Capacitor 40 has its origin in the capacitive relationship between electrodes 22 and 24 while capacitor 41 obtains from the capacitive relationship between electrodes 22 and 26.

Figure 10:
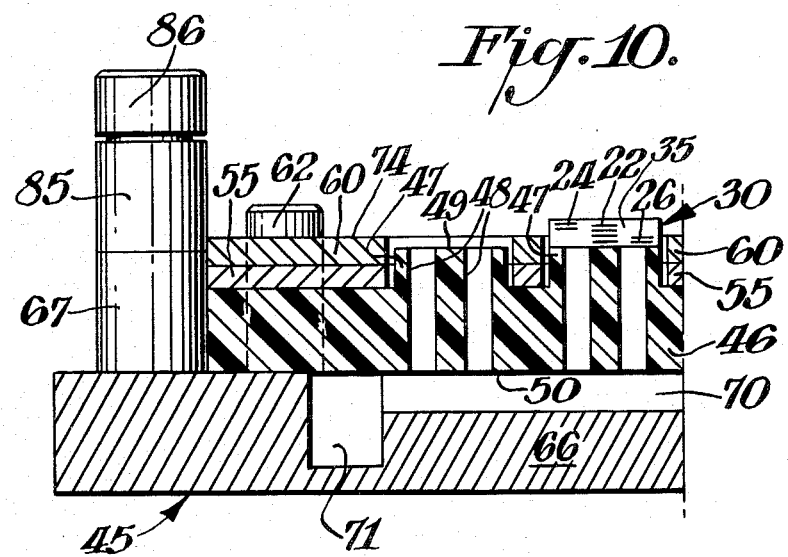
FIG. 10 shows in side sectional view taken in plane 10—10 the jig of FIG. 9.

A composite holding jig 45 illustrated in FIGS. 9 and 10 is employed in a preferred method for terminating capacitors of this invention. A major part of the jig 45 is an elastomeric holding plate 46 having a plurality of raised mesas 47 in a regular matrix pattern with openings 48 leading from the tops 49 of each of the mesas to the underneath or bottom side 50 of the plate 46. Another jig part, a transport plate 55, has a matrix of oval apertures 56 through which the oval mesas 47 will pass. Apertures 56 are most easily seen in the right hand part of FIG. 9 wherein the other jig parts are broken away.

An organization plate 60 has a matrix of rectangular holes 61 that are coincident with the mesas 47 and the holes 56 when the plates 46, 55 and 60 are stacked and registered over each other. This registration is maintained by dowel pin 62 that passes through registration holes in these three plates. Another such registration dowel pin (not shown) is employed at another edge of the jig 45.

The three plates 46, 55 and 60 are supported by a base plate 66 having four guide rollers 67, only one of which is shown, to register (left to right as shown in FIG. 10) the plates 46, 55 and 60. When so positioned and held flush with the bottom edge of base plate 66 as shown in FIG. 9, the mesa openings 48 in each row of the matrix are in line with one of the troughs 70 in base plate 66. Troughs 70 are shown by dashed lines in FIG. 9, and they connect with channel 71. Connection 72 is adapted to connect a vacuum line (not shown) to draw a partial vacuum in channel 71 and troughs 70.

With a vacuum applied, mature monolithic ceramic capacitor bodies 30 are poured onto the top surface 74 of jig 45. The jig is shaken laterally i.e. in the plane of the top surface 74. The rectangular chip shaped bodies have length and width dimensions that are slightly less than corresponding dimensions of the rectangular holes 61 in the organization plate 60, and this shaking procedure while the vacuum is applied is effective in filling most of the jig cavities. (The perimeter of the organization plate holes 61 define the walls and the tops 49 of the mesas 47 define the bottoms of the jig cavities.) The cavities remaining empty are then filled by individually putting a chip in each, e.g. by urging along with a brush or small stick or even the fingers. The inward rush of air into the mesa openings 48 to the vacuum troughs 70 draws the chips and holds them into each cavity so this manual completion of the jig loading step is accomplished expeditiously. After the excess chips are cleared away from the completely loaded jig 45, the organization plate 60 is lifted off.

With reference to FIGS. 11 and 12, an inking stamp 77 has a plurality of parallel bars 79 that are spaced by an amount corresponding to the spacings of the groups of extended electrodes 24, 22 and 26 respectively, of a chip 30 (see FIG. 10). Stubby finger-like projections 80 extend from the flat bottom surface 81 of each bar 79. These projections from each bar 79 are spaced by a distance corresponding to the spacing of the mesas 47 in a column, e.g. the column having center line 69 in FIG. 9. This, of course, corresponds in turn to the spacing of chips 30 in that jig column when the jig 45 is loaded.

A conductive ink, e.g. silver particles in an organic vehicle is applied to the bars 79 and projections 80. This may be accomplished by dipping that portion of stamp 77 into a shallow puddle or pool of the ink that is only slightly deeper than the height of the projections 80 to insure that ink coverage of the flat bar surfaces 81 is complete.

The ink bearing stamp, being held by a handle 83 (only partially shown in FIG. 12), is placed over the loaded jig 45. It is guided by guide rollers 85 (FIG. 10). Post 86 supports roller 67 and roller 85. The stamp projections 80 are introduced into the spaces between the adjacent capacitor chips 30 in each column, as can be seen in FIG. 12. The flat bar surfaces 81 are pressed against the upper major surfaces of the chips 30. The stamp 77 is then moved to and fro (left to right in FIG. 12) in the direction parallel to column center lines (e.g. 69) to deposit layer strips of ink on the major surfaces of the chips (from the inked flat bar surfaces 81) and to squeeze ink against the chip edges 35. Ink is also squeezed onto the chip edges opposite edge 36. Thus, no matter which way the chip 30 was loaded into the jig, e.g. chips 30' and 30'' of FIG. 12 having their electrode exposed edges 35 in opposite directions, the electrodes will surely be contacted by the ink.

With reference to FIGS. 13A, 13B and 14, a number of green ceramic layers 90a each carrying an electrode 91 may be interleaved with green ceramic layers 90b each carrying an electrode 92. After firing the stack the ceramic capacitor chip 94 may be inked by the above described method to provide conductive layer strips 96 and 97. In this case each electrode 91 or 92 is contacted twice, by inked strips 96 or 97, respectively, once at chip edge 98 and again at the opposite edge 99. This may provide an added degree of reliability, and/or improve the high frequency performance of the capacitor 100 of FIG. 15 that derives from the capacitive relationship between electrodes 91 and electrodes 92 in chip 94.

What is claimed is:

1. A monolithic ceramic capacitor having a rectangular chip shaped ceramic body with a plurality of sets of electrodes buried therein wherein the improvement comprises:

said sets of electrodes extending to only one particular edge of said body at separate portions thereof, respectively, a plurality of parallel spaced conductive layer strips, one part of each of said strips being bonded to and extending fully across only one major face of said chip shaped body and another part further extending over one of said particular edge portions to contact the corresponding of said electrode sets.

2. The capacitor of claim 1 wherein said plurality of electrode sets consists of two interdigitated sets having a capacitive relationship therebetween.

3. The capacitor of claim 1 wherein said plurality of electrode sets consists of three sets, a first and second set each having a subtantially equal capacitive relationship with a third set, said particular edge portion to which said third set electrodes extend being located between said edge portions to which said first and second set electrodes extend, respectively.

4. The capacitor of claim 1 wherein said conductive layer strips are comprised mainly of silver.

5. The capacitor of claim 1 additionally comprising a plurality of lead wires being attached to said one parts of said strips, respectively, one end of each of said attached wires extending away from said ceramic body.

6. A monolithic ceramic capacitor having a rectangular chip shaped ceramic body with a plurality of sets of electrodes buried therein wherein the improvement comprises:

each of said sets of electrodes extending both to a separate portion of one particular edge and to a corresponding separate portion of the opposite edge of said body, a plurality of parallel spaced conductive layer strips, each said strip being bonded to only one major face of said chip shaped body and extending both over one of said separate portions of said particular edge and over the corresponding of said separate portions of said opposite edge to redundantly contact at said particular and said opposite edges one of said electrode sets.

7. A monolithic ceramic capacitor comprising a ceramic body; a first and second set of electrodes being buried in said body, said body having a rectangular chip shape, said first set electrodes extending to a first portion of a particular edge of said body and said second set electrodes extending to a second portion of said particular edge; a first conductive layer strip overlying one of the two major chip faces from said particular edge to the opposite edge forming a first termination pad there and extending over said first portion of said particular edge to contact said first set electrodes; and a second conductive layer strip being spaced from said first strip and overlying said one major face from said particular edge to said opposite edge forming a second termination pad there and extending over said second portion of said particular edge to contact said second set electrodes.

* * * * *